US012354527B2

(12) United States Patent
Harada et al.

(10) Patent No.: US 12,354,527 B2
(45) Date of Patent: Jul. 8, 2025

(54) DISPLAY DEVICE

(71) Applicant: Japan Display Inc., Tokyo (JP)

(72) Inventors: Tsutomu Harada, Tokyo (JP); Kazunari Tomizawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 160 days.

(21) Appl. No.: 18/230,459

(22) Filed: Aug. 4, 2023

(65) Prior Publication Data

US 2024/0062707 A1 Feb. 22, 2024

(30) Foreign Application Priority Data

Aug. 19, 2022 (JP) ................................ 2022-131030

(51) Int. Cl.
*G09G 3/32* (2016.01)
*G09G 3/3225* (2016.01)

(52) U.S. Cl.
CPC ............ *G09G 3/32* (2013.01); *G09G 3/3225* (2013.01); *G09G 2320/0242* (2013.01); *G09G 2320/0271* (2013.01)

(58) Field of Classification Search
None
See application file for complete search history.

(56) References Cited

U.S. PATENT DOCUMENTS

2006/0164348 A1* 7/2006 Ozawa .................... G09G 3/22 345/76
2010/0315443 A1* 12/2010 Furukawa ............ G09G 3/3648 345/87
2011/0057961 A1* 3/2011 Tsuru .................... G09G 3/342 345/89

FOREIGN PATENT DOCUMENTS

JP 2002-351386 A 12/2002

* cited by examiner

*Primary Examiner* — Nicholas J Lee
(74) *Attorney, Agent, or Firm* — K&L Gates LLP

(57) ABSTRACT

A display device includes a plurality of light emitting devices included in a pixel, and a control circuit configured to define each of a plurality of subframe periods included in a frame period during which a frame image is displayed as one of an emission period in which the light emitting device is in an emission state and a non-emission period in which the light emitting device is in a non-emission state, and to control emission of the light emitting device, based on a gradation value of the pixel.

15 Claims, 6 Drawing Sheets

1

FIG.8

| SPECIFIC GRADATION VALUE | SUBFRAME PERIOD | | | | | | | |
|---|---|---|---|---|---|---|---|---|
| | SF1 | SF2 | SF3 | SF4 | SF5 | SF6 | SF7 | SF8 |
| 0 | N | N | N | N | N | N | N | N |
| 1 | Y | N | N | N | N | N | N | N |
| 2 | N | Y | N | N | N | N | N | N |
| 3 | Y | Y | N | N | N | N | N | N |
| 4 | N | N | Y | N | N | N | N | N |
| 6 | N | Y | Y | N | N | N | N | N |
| 7 | Y | Y | Y | N | N | N | N | N |
| 12 | N | N | Y | Y | N | N | N | N |
| 14 | N | Y | Y | Y | N | N | N | N |
| 15 | Y | Y | Y | Y | N | N | N | N |
| 28 | N | N | Y | Y | Y | N | N | N |
| 30 | N | Y | Y | Y | Y | N | N | N |
| 31 | Y | Y | Y | Y | Y | N | N | N |
| 60 | N | N | Y | Y | Y | Y | N | N |
| 62 | N | Y | Y | Y | Y | Y | N | N |
| 63 | Y | Y | Y | Y | Y | Y | N | N |
| 124 | N | N | Y | Y | Y | Y | Y | N |
| 126 | N | Y | Y | Y | Y | Y | Y | N |
| 127 | Y | Y | Y | Y | Y | Y | Y | N |
| 252 | N | N | Y | Y | Y | Y | Y | Y |
| 254 | N | Y | Y | Y | Y | Y | Y | Y |
| 255 | Y | Y | Y | Y | Y | Y | Y | Y |

DISPLAY DEVICE

CROSS-REFERENCE TO RELATED APPLICATION

This application claims the benefit of priority from Japanese Patent Application No. 2022-131030 filed on Aug. 19, 2022, the entire contents of which are incorporated herein by reference.

BACKGROUND

1. Technical Field

The present invention relates to a display device.

2. Description of the Related Art

Japanese Patent Application Laid-open Publication No. 2002-351386 (JP-A-2002-351386) discloses a plasma display device that represents intermediate gradations by dividing one field period for displaying an image into a plurality of subfields and defining emission and non-emission of discharge cells corresponding to a single pixel in each of the subfields. The subfields are consecutively lined up in order of shortest emission period from the beginning of one field period.

Such a method of using a plurality of subfields to represent intermediate gradations can cause what is called dynamic false contours (color breakup) and image degradation. Therefore, in the plasma display device of JP-A-2002-351386, one field period includes a first subfield group including a plurality of subfields emission periods of which are weighted, and a second subfield group including a plurality of subfields defined by a given emission period, and a subfield group corresponding to a pixel level value (gradation value) is used to control the emission from the discharge cell. This prevents color breakup from occurring.

There is a demand to better prevent color breakup from occurring in display devices.

It is an object of the present disclosure to provide a display device that is capable of better preventing color breakup from occurring in view of the aforementioned problem.

SUMMARY

A display device according to an embodiment of the present disclosure includes a plurality of light emitting devices included in a pixel, and a control circuit configured to define each of a plurality of subframe periods included in a frame period during which a frame image is displayed as one of an emission period in which the light emitting device is in an emission state and a non-emission period in which the light emitting device is in a non-emission state, and to control emission of the light emitting device, based on a gradation value of the pixel. The subframe periods are consecutively lined up from a beginning of the frame period, and in a case where the gradation value of the pixel corresponds to a first eliminated gradation value corresponding to the frame period that has the subframe period that is the non-emission period on a beginning side of the subframe period that is the emission period in a given subframe period set in advance and the subsequent subframe periods among the subframe periods, the control circuit modifies the gradation value of the pixel to a specific gradation value corresponding to the frame period during which the given subframe period is the emission period and the subframe periods that are the emission periods are consecutively lined up.

A display device according to an embodiment of the present disclosure includes a plurality of light emitting devices included in a pixel, and a control circuit configured to define each of a plurality of subframe periods included in a frame period during which a frame image is displayed as one of an emission period in which the light emitting device is in an emission state and a non-emission period in which the light emitting device is in a non-emission state, and to control emission of the light emitting device, based on a gradation value of the pixel. The subframe periods are consecutively lined up from a beginning of the frame period, and in a case where the gradation value of the pixel corresponds to a gradation value corresponding to the frame period that has the subframe period that is the non-emission period between two of the subframe periods that are the emission periods, the control circuit modifies the gradation value of the pixel to a gradation value corresponding to the frame period during which the subframe periods that are the emission periods are consecutively lined up.

BRIEF DESCRIPTION OF THE DRAWINGS

FIG. 8 is a table illustrating specific gradation values;

DETAILED DESCRIPTION

Figure 1:
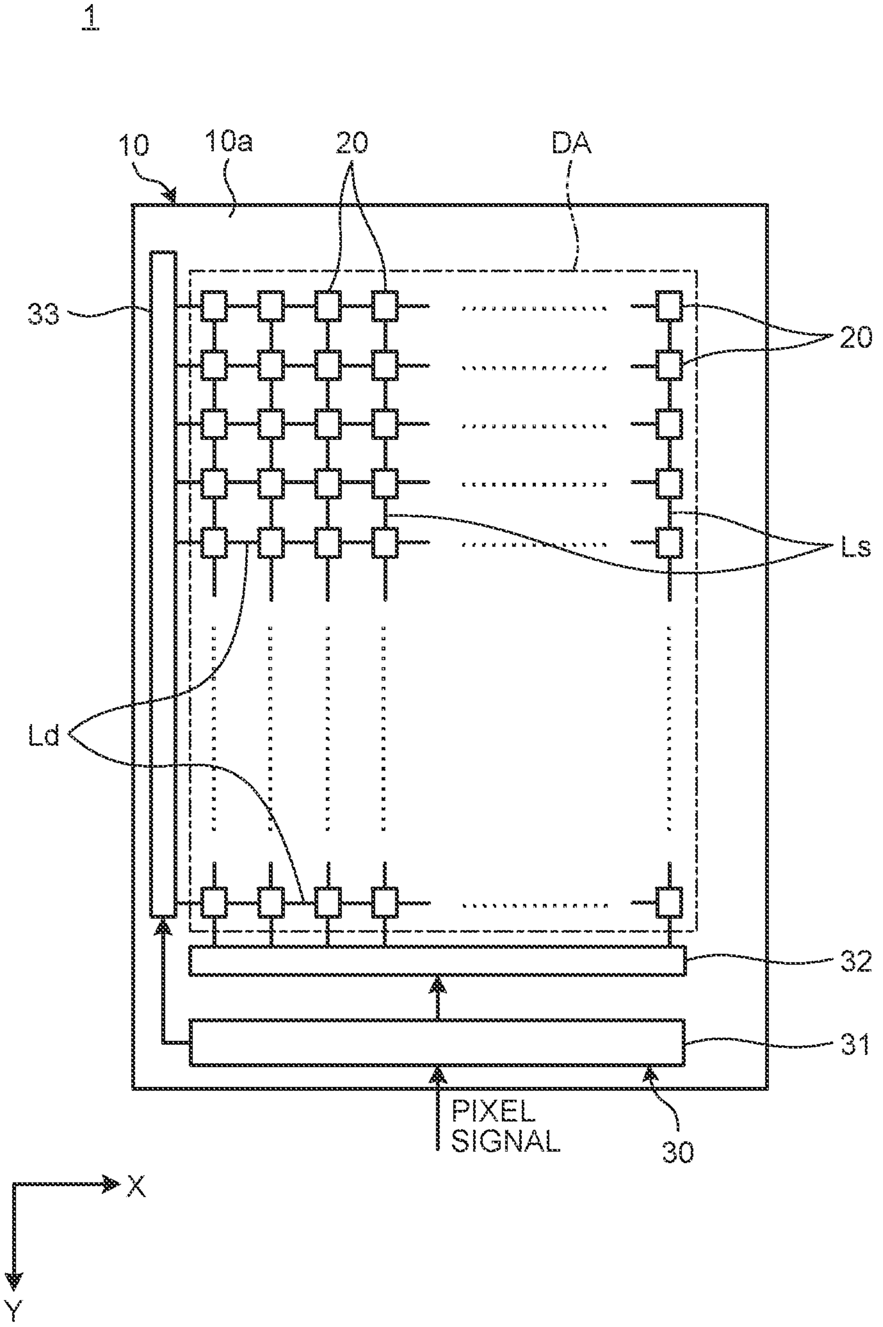
FIG. 1 is a schematic diagram illustrating a configuration of a display device.

Embodiments of the present disclosure will be described below with reference to the drawings. The description of the following embodiments does not limit the present disclosure. Components described below include those that could be easily assumed by a person skilled in the art and those that are substantially the same. Furthermore, the components described below can be combined as appropriate.

What is disclosed herein is merely an example, and, as may be understood, the scope of the present disclosure includes any modification that a person skilled in the art could easily conceive of and that could be made as appropriate while the spirit of the present disclosure is maintained. Although the width, the thickness, the shape, and the like of constituents may be schematically represented in the drawings as compared with the actual aspect in order to clarify the explanation, it is merely an example and does not limit the interpretation of the present disclosure. In the present specification and the drawings, the same reference signs are given to the same components as those described earlier for the drawings that have been previously presented, and detailed description thereof may be omitted as appropriate.

The X and Y directions illustrated in the drawings correspond to the directions parallel to a main surface 10*a* of a substrate 10 included in a display device 1. The +X and −X sides in the X direction and the +Y and −Y sides in the Y direction correspond to the sides of the display device 1. The main surface 10*a* side of the substrate 10 corresponds to the front of the display device 1. The X and Y directions are examples, and the present disclosure is not limited to these directions.

FIG. 1 is a schematic diagram illustrating a configuration of the display device 1. The display device 1 is a display panel that displays frame images in a display area DA on the basis of pixel signals described below that are output from an external device (not illustrated). The display area DA is on the front of the display panel. A single frame image is a still image included in a video. The display device 1 includes the substrate 10, a plurality of pixel drive circuits 20, and a control circuit 30.

The pixel drive circuits 20 overlap the display area DA in plan view, and are arranged in a matrix (a row-column configuration) along the X and Y directions on the main surface 10*a* of the substrate 10.

Figure 2:
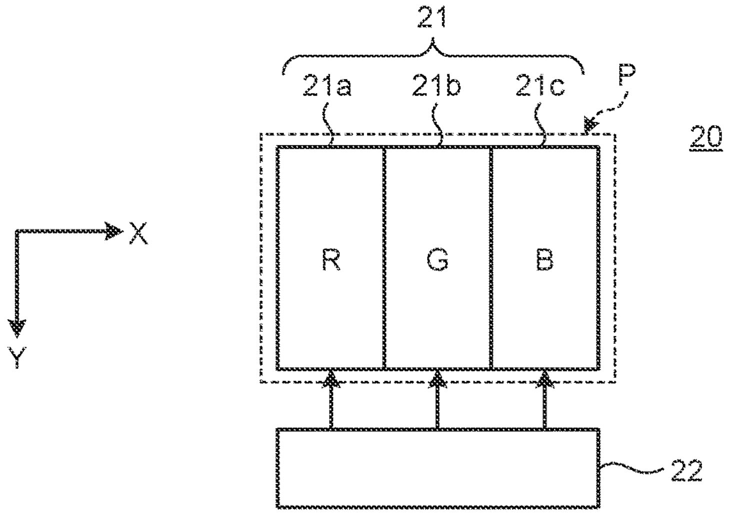
FIG. 2 is a block diagram illustrating a configuration of a pixel drive circuit.

FIG. 2 is a block diagram illustrating a configuration of the pixel drive circuit 20. The pixel drive circuits 20 each includes a plurality of light emitting devices 21 and a device drive circuit 22. A pixel P in the frame image includes the light emitting devices 21.

The light emitting device 21 is a light emitting diode (LED), and is an inorganic light emitting device (inorganic light emitting diode) having a light emitting layer of inorganic material. The size of the light emitting device 21 is about 3 μm to 300 μm in plan view. In other words, the light emitting device 21 is what is called a micro LED. The light emitting device 21 may be an organic light emitting device (organic light emitting diode) having a light emitting layer of organic material, and the size of the light emitting device 21 may be smaller or larger than the aforementioned size. Not to mention, the light emitting device 21 is not limited to those described above, but may be any self-emitting light source capable of controlling emission timing.

Each of the light emitting devices 21 has a first light emitting device 21*a*, which is a red light emitting device that emits red (R) light, a second light emitting device 21*b*, which is a green light emitting device that emits green (G) light, and a third light emitting device 21*c*, which is a blue light emitting device that emits blue (B) light. Not to mention, the colors emitted by the light emitting devices 21 are not limited to those described above. When the first light emitting device 21*a*, the second light emitting device 21*b*, and the third light emitting device 21*c* are described without distinction, they are simply referred to as "light emitting device 21".

The first light emitting device 21*a*, the second light emitting device 21*b*, and the third light emitting device 21*c* are arranged along the X direction from the −X side to the +X side.

The device drive circuit 22 drives the light emitting device 21. The device drive circuit 22 drives the light emitting device 21 on the basis of gradation data described below, whereby the emission state of the light emitting device 21 is controlled and the gradation of the pixel P is adjusted. The gradation data indicates the gradation value of the pixel P, and is a binary representation of the gradation value indicated by a decimal system. The gradation data specifies the timing at which the light emitting device 21 emits light during a frame period F during which the frame image is displayed, as described below.

Figure 3:
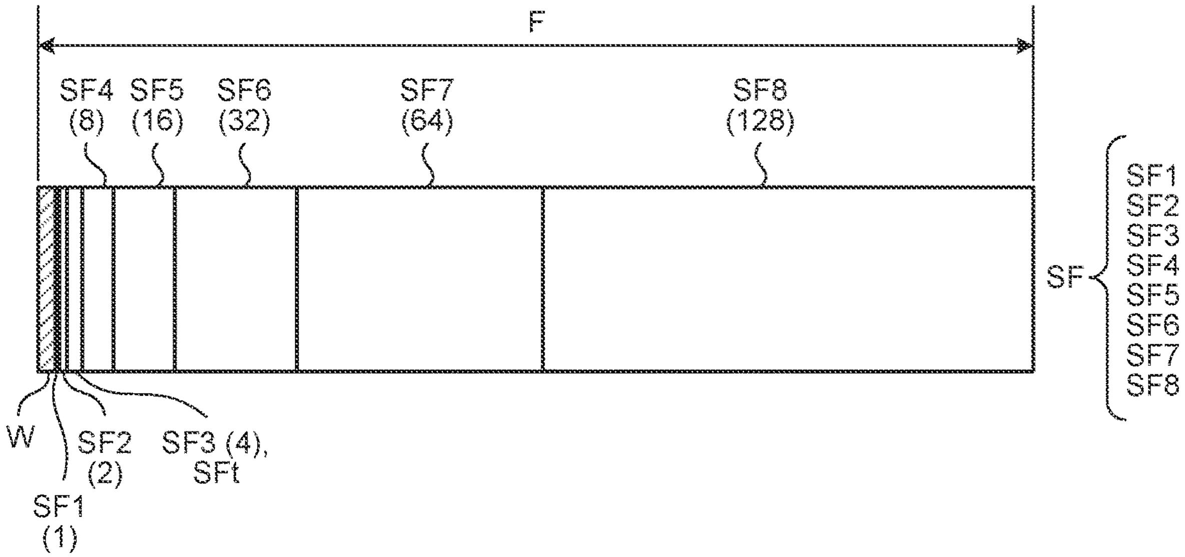
FIG. 3 is a diagram illustrating a frame period.

FIG. 3 is a diagram illustrating the frame period F. The frame period F includes a write period W and a plurality of subframe periods SF. The write period W is the period during which the gradation data is written to the device drive circuit 22.

The number of subframe periods SF is equal to the number of bits in gradation data. A case where the number of bits in gradation data is 8 bits and the number of subframe periods SF is 8 will be described next. When the number of bits in gradation data is 8, the gradation of the pixel P can be expressed in 256 steps from 0 to 255 gradation values.

The frame period F has the write period W, a first subframe period SF1, a second subframe period SF2, a third subframe period SF3, a fourth subframe period SF4, a fifth subframe period SF5, a sixth subframe period SF6, a seventh subframe period SF7, and an eighth subframe period SF8, and are consecutively lined up in this order from the beginning.

The subframe periods SF are lined up in order of shortest period from the beginning, and the ratio of two subframe periods SF that are adjacent to each other in the subframe periods SF is 2. Specifically, the ratio of the first subframe period SF1, the second subframe period SF2, the third subframe period SF3, the fourth subframe period SF4, the fifth subframe period SF5, the sixth subframe period SF6, the seventh subframe period SF7, and the eighth subframe period SF8 is 1:2:4 8:16:32:64:128. In other words, what is called a binary weighting using a geometric progression with a common ratio of "2" is applied to the subframe periods SF. The values in parentheses near the signs of the subframe periods SF illustrated in FIG. 3 indicate the aforementioned ratios, or weighting values.

The gradation data identifies whether the light emitting device 21 is to emit light for each of the subframe periods SF during the frame period F. The gradation data is 8-bit data as described above. In the gradation data, "1" indicates the emission state of the light emitting device 21, and "0" (zero) indicates the non-emission state of the light emitting device 21. In the gradation data, the n-th bit value corresponds to the n-th subframe period SF (n is a natural number from 1 to 8). For example, in the gradation data, the first bit corresponds to the first subframe period SF1, and the fifth bit corresponds to the fifth subframe period SF5.

Specifically, when the gradation data is "01111111" (gradation value: 127), the first to seventh bits are "1" and the eighth bit is "0". Thus, in this case, the light emitting device 21 is in the emission state during all the subframe periods SF from the first subframe period SF1 to the seventh subframe period SF7, and the light emitting device 21 is in the non-emission state during the eighth subframe period SF8.

When the gradation data is "10000000" (gradation value: 128), the first to seventh bits are "0" and the eighth bit is "1". Thus, in this case, the light emitting device 21 is non-emission state during all the subframe periods SF from the first subframe period SF1 to the seventh subframe period SF7, and the light emitting device 21 is in the emission state during the eighth subframe period SF8. The light emitting devices 21 emit light with equal luminance (emission intensity) to each other.

The device drive circuit 22 drives the light emitting device 21 on the basis of gradation data, whereby the emission state of the light emitting device 21 is controlled for each of the subframe periods SF as described above and the gradation per frame period F is adjusted. The emission state of the light emitting device 21 is controlled in one pixel drive circuit 20 for each of the light emitting devices 21, whereby the color and gradation of the pixel P corresponding to that pixel drive circuit 20 is adjusted. Furthermore, the color and gradation of the corresponding pixels P are adjusted in each of the pixel drive circuits 20, whereby a frame image is displayed in the display area DA. In other words, the total emission period corresponds to a gradation during one frame period F.

The control circuit 30 illustrated in FIG. 1 controls the emission of the device drive circuit 22 and thus the light emitting device 21. The control circuit 30 includes an image processing circuit 31, a signal output circuit 32, and a scanning circuit 33.

The image processing circuit 31 acquires a pixel signal corresponding to the frame image, generates a drive signal having the aforementioned gradation data on the basis of the pixel signal, and transmits the signal to the signal output circuit 32 (details will be described below). The image processing circuit 31 outputs a clock signal to the signal output circuit 32 and the scanning circuit 33 to synchronize the operation of the signal output circuit 32 with that of the scanning circuit 33.

The signal output circuit 32 is electrically coupled to the pixel drive circuits 20 via a plurality of signal lines Ls. The signal lines Ls extend along the Y direction and are aligned along the X direction. One signal line Ls is common in the pixel drive circuits 20 aligned along the Y direction. The signal output circuit 32 outputs a drive signal having the aforementioned gradation data to the pixel drive circuits 20.

The scanning circuit 33 is electrically coupled to the pixel drive circuits 20 via a plurality of scanning lines Ld. The scanning lines Ld extend along the X direction and are aligned along the Y direction. One scanning line Ld is common in the pixel drive circuits 20 aligned along the X direction. The scanning circuit 33 scans the pixel drive circuits 20 in synchronization with the output of the drive signal from the signal output circuit 32.

Figure 4:
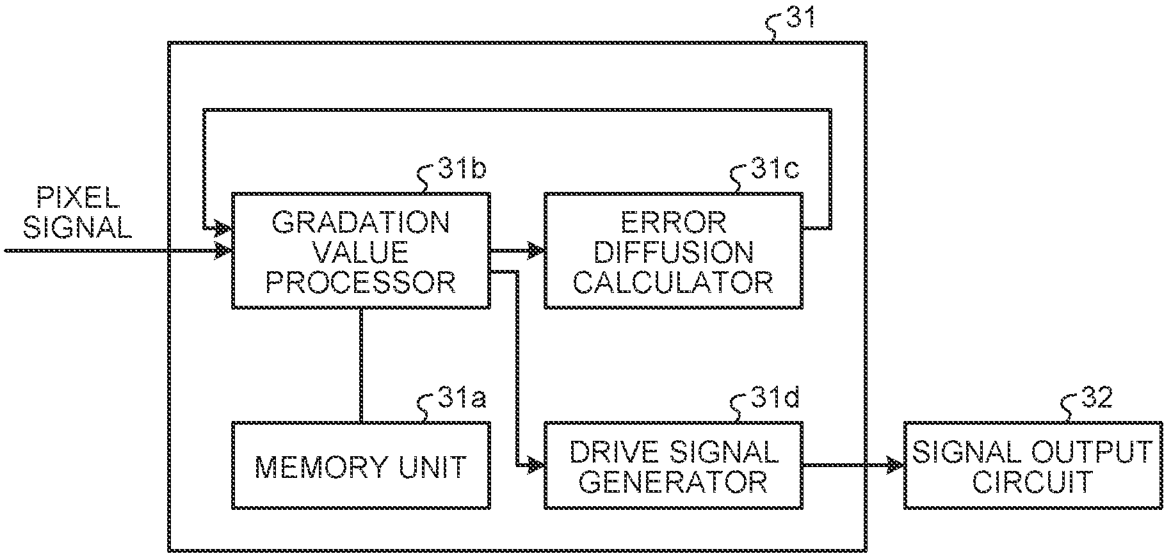
FIG. 4 is a block diagram of an image processing circuit.

FIG. 4 is a block diagram of the image processing circuit 31. The image processing circuit 31 has a memory circuit 31*a*, a gradation value processor 31*b*, an error diffusion calculator 31*c*, and a drive signal generator 31*d*.

The memory circuit 31*a* stores therein a table indicating specific gradation values, which are gradation values that can prevent color breakup described next.

Color breakup is a degradation of the frame image due to blurring of the frame image contours when the viewer of the display device 1 moves his/her eyes. A specific example of color breakup will be described below using a case where yellow is displayed in one pixel P.

Figure 5:
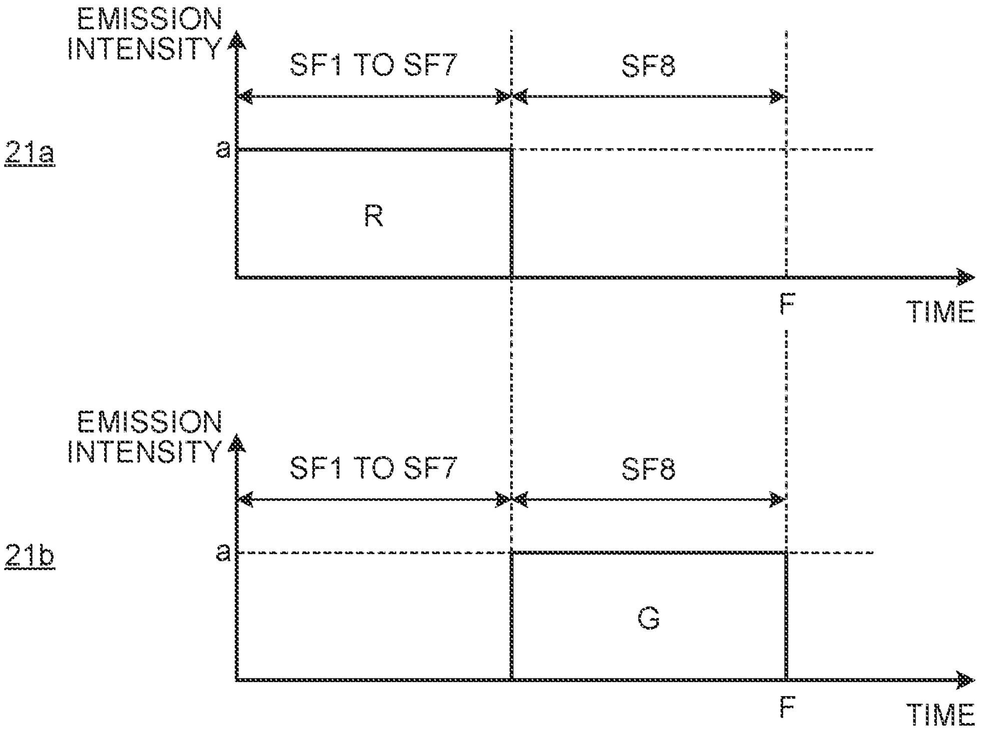
FIG. 5 is a diagram illustrating a relation between the emission period and the emission intensity of a light emitting device per frame period in a case where yellow is displayed in one pixel.

FIG. 5 is a diagram illustrating a relation between the emission period and the emission intensity of the light emitting device 21 per frame period F in the case where yellow is displayed in one pixel P. When yellow is displayed in one pixel P, an example of the gradation data is "01111111" (gradation value: 127) for the red (R) gradation data corresponding to the first light emitting device 21*a*, "10000000" (gradation value: 128) for the green (G) gradation data corresponding to the second light emitting device 21*b*, "00000000" (gradation value: 0) for the blue (B) gradation data corresponding to the third light emitting device 21*c*. The emission intensity of the light emitting devices 21 is equal to each other among the light emitting devices 21, and is constant during the frame period F.

In other words, in the red first light emitting device 21*a*, the first subframe period SF1 to the seventh subframe period SF7 are an emission period, with the emission intensity constant at "a", and the eighth subframe period SF8 is a non-emission period. In the green second light emitting device 21*b*, the first subframe period SF1 to the seventh subframe period SF7 are a non-emission period, and the eighth subframe period SF8 is an emission period, with the emission intensity constant at "a". In the blue third light emitting device 21*c*, the first subframe period SF1 to the eighth subframe period SF8 are a non-emission period, and are omitted from the figure.

In this manner, during the frame period F in one pixel P, the red first light emitting device 21*a* is in the emission state in the first half and the green second light emitting device 21*b* is in the emission state in the second half, and the emission periods do not overlap between the first light emitting device 21*a* and the second light emitting device 21*b*.

Figure 6:
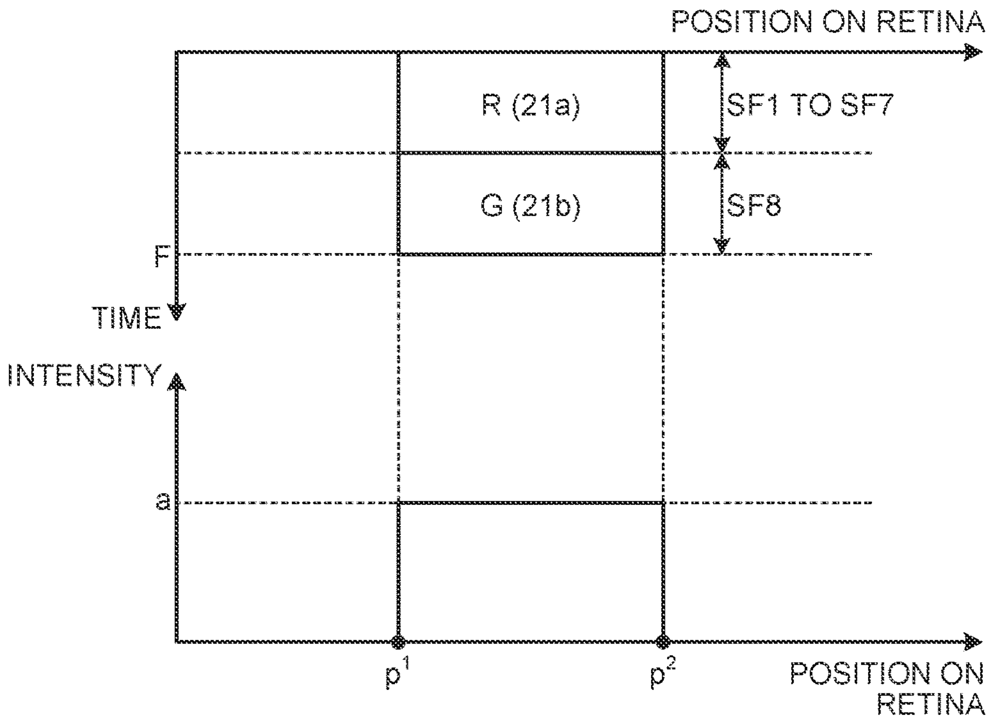
FIG. 6 is a diagram illustrating a relation between the emission period and the position on a viewer's retina, as well as the relation between the intensity of light and the position on the retina per frame period in a case where the viewer is not moving his/her eyes and yellow is displayed in one pixel.

First, a state in which the viewer is not moving his/her eyes and no color breakup occurs will be described. FIG. 6 is a diagram illustrating a relation between the emission period and the position on the viewer's retina, as well as the relation between the intensity of light and the position on the retina per frame period F in a case where the viewer is not moving his/her eyes and yellow is displayed in one pixel P.

As illustrated in the upper side of FIG. 6, the red first light emitting device 21*a* is in the emission state in the first half of the frame period F, and the green second light emitting device 21*b* is in the emission state in the second half of the frame period F. When the viewer is not moving his/her eyes, the positions on the retina corresponding to the emission periods of the red first light emitting device 21*a* and the green second light emitting device 21*b* are the same as each other. Thus, in this case, as illustrated in the lower side of FIG. 6, the light emitted by the red first light emitting device 21*a* and the light emitted by the green second light emitting device 21*b* overlap on the retina (between points p1 and p2), and the viewer sees the color of one pixel P as yellow. In other words, no color breakup has occurred.

Figure 7:
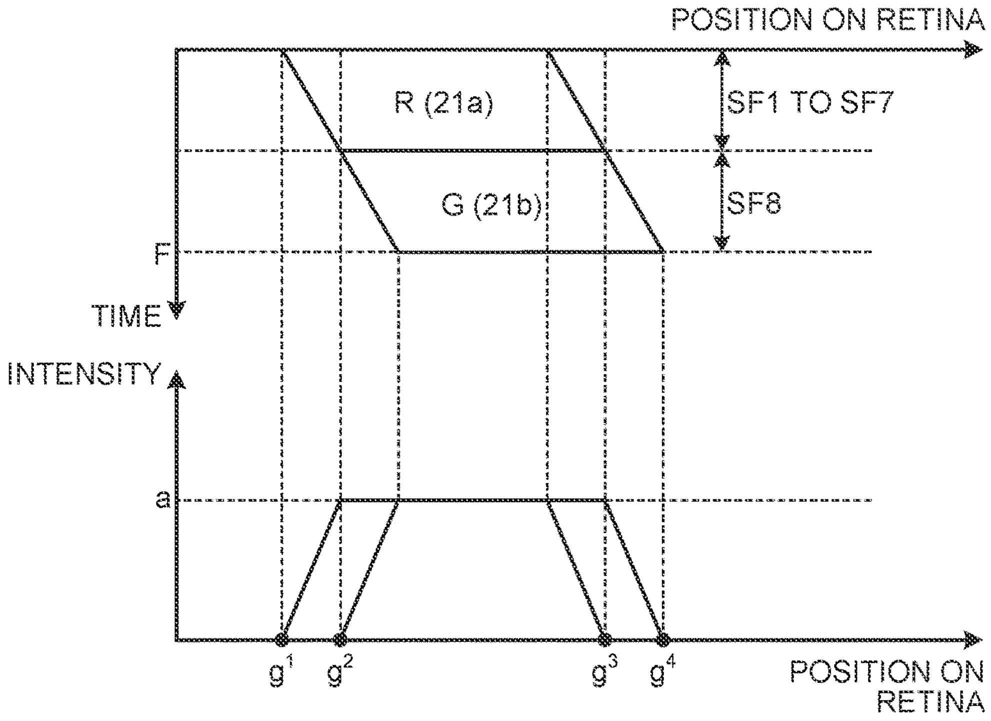
FIG. 7 is a diagram illustrating the relation between the emission period and the position on the viewer's retina, as well as the relation between the intensity of light and the position on the retina per frame period in a case where the viewer is moving his/her eyes and yellow is displayed in one pixel.

Next, a state in which the viewer moves his/her eyes and color breakup occurs will be described. FIG. 7 is a diagram illustrating the relation between the emission period and the position on the viewer's retina, as well as the relation between the intensity of light and the position on the retina per frame period F in a case where the viewer is moving his/her eyes and yellow is displayed in one pixel P. In FIG. 7, the viewer is moving his/her eyes along the X direction from the −X side to the +X side.

As described above, the red first light emitting device 21*a* is in the emission state in the first half of the frame period F, and the green second light emitting device 21*b* is in the emission state in the second half of the frame period F. The red first light emitting device 21*a* and the green second light emitting device 21*b* are aligned along the X direction from the −X side to the +X side in the device drive circuit 22. Thus, when the viewer moves his/her eyes along the X direction from the −X side to the +X side, as illustrated in the upper side of FIG. 7, first, only the emission period of the red first light emitting device 21*a* corresponds to the position on the retina. Subsequently, both the emission period of the red first light emitting device 21*a* and the emission period of the green second light emitting device 21*b* correspond to the positions on the retina, and then only the emission period of the green second light emitting device 21*b* corresponds to the position on the retina.

Consequently, when the viewer moves his/her eyes along the X direction from the −X side to the +X side, as illustrated in the lower side of FIG. 7, first, only the light emitted by the red first light emitting device 21*a* is located on the retina (between points g1 and g2).

Subsequently, the light emitted by the red first light emitting device 21*a* and the light emitted by the green second light emitting device 21*b* overlap on the retina (between points g2 and g3), and furthermore, only the light emitted by the green second light emitting device 21*b* is located on the retina (between points g3 and g4). In other words, during the frame period F, the viewer sees the colors of its pixel P in the order of red, yellow, and green. In other words, the viewer sees colors (red and green) different from the desired color (yellow) as the eyes move, causing color breakup that blurs the frame image contours and degrades the frame image.

In this manner, if the emission periods of the light emitting devices 21 do not overlap during the frame period F, as illustrated in FIGS. 5, 6, and 7, or if the overlap is relatively small, the light of the light emitting devices 21 is easily visible alone and color breakup is relatively easy to occur.

If a relatively long subframe period SF is a non-emission period and the non-emission subframe period SF is interrupted by emission subframe periods SF (i.e., discontinuity in the emission period), color breakup is relatively easy to occur.

Specifically, when the gradation data corresponding to the red first light emitting device 21*a* is "10011111" (gradation value: 159), and the sixth and seventh subframe periods SF, which are relatively long periods, are non-emission periods, and the fifth and eighth subframe periods SF are emission periods, the gradation data corresponding to the green second light emitting device 21*b* is "11111111" (gradation value: 255). When the fifth, sixth, seventh, and eighth subframe periods SF are emission periods, the color of the second light emitting device 21*b*, which is an emission period during the non-emission period of the first light emitting device 21*a*, is easily visible alone, and color breakup is easy to occur.

Therefore, in the display device 1 of the present embodiment, when the emission periods are discontinuous, a relatively long subframe period SF is prevented from being a non-emission period, and furthermore, the emission period is moved toward the beginning of the frame period F, whereby the emission periods of the light emitting devices 21 are overlapped during the frame period F.

Specifically, the control circuit 30 adjusts the gradation of the pixel P by using specific gradation values described next. The specific gradation values include a gradation value (0) for which the subframe periods SF are all non-emission periods. The specific gradation values include gradation values for which the emission periods are not discontinuous when two or more subframe periods SF are emission periods, that is, the emission periods are continuous.

The specific gradation values include gradation values for which only one subframe period SF among the subframe periods SF before a given subframe period SFt set in advance is an emission period. The specific gradation values include gradation values that are larger than the gradation value for which only the given subframe period SFt is an emission period, and that correspond to the frame period F during which the given subframe period SFt is the emission period and the subframe periods SF that are emission periods are consecutively lined up. Specific examples of specific gradation values will be described below.

The given subframe period SFt is a relatively short subframe period SF such that color breakup is unlikely to Occur. The given subframe period SF is determined in advance by experimentation, for example. Specifically, the given subframe period SFt corresponds to a subframe period SF in the first half of the frame period F among the subframe periods SF. In the present embodiment, the number of the subframe periods SF is 8, and the given subframe period SFt is the third subframe period SF3 that is the third from the beginning. Not to mention, the given subframe period SFt is not limited to the subframe period SF in the first half of the frame period F, and the given subframe period SFt is not limited to the third subframe period SF3.

FIG. 8 is a table illustrating specific gradation values. In FIG. 8, "Y" in the columns indicates that the corresponding subframe period SF is an emission period. "N" in the columns indicates that the corresponding subframe period SF is a non-emission period. In other words, "Y" and "N" in the columns indicate that the subframe periods SF corresponding to the specific gradation values are defined as one of the emission and non-emission periods, and correspond to the gradation data corresponding to the specific gradation values. Specifically, "Y" in the columns corresponds to "1" in the gradation data, and "N" in the columns corresponds to "0" (zero) in the gradation data.

As illustrated in FIG. 8, the specific gradation values include a gradation value (corresponding to the specific gradation value of "0" illustrated in FIG. 8) for which the subframe periods SF are all non-emission periods, and gradation values (corresponding to the specific gradation values of "3" and "6" and thereafter illustrated in FIG. 8) for which the emission periods are consecutive when the subframe periods SF have two or more emission periods. The specific gradation values include gradation values (corresponding to the specific gradation values of "1", "2", and "4" illustrated in FIG. 8) for which only one subframe periods SF among the subframe periods SF before the given subframe period SFt (the third subframe period SF3 in the present disclosure) is an emission period.

The specific gradation values include gradation values that satisfy the following conditions (1) and (2) among gradation values that are larger than the gradation value for which only the given subframe period SFt is an emission period. Condition (1) is that the given subframe period SFt be an emission period. Condition (2) is that the subframe periods SF, which are emission periods, be consecutively lined up. The specific gradation values that satisfy conditions (1) and (2) correspond to the specific gradation values of "6" and thereafter illustrated in FIG. 8.

The table illustrated in FIG. 8 is stored in advance in the memory circuit 31*a*. The control circuit 30 generates a drive signal having gradation data on the basis of the 22 specific gradation values illustrated in FIG. 8, as described below.

The gradation value processor 31*b* illustrated in FIG. 4 acquires the gradation values of the pixel P that the pixel signal has and error values calculated by the error diffusion calculator 31*c*, which will be described below, and adds the error values corresponding to the pixel P to the gradation values of the pixel P.

The gradation values of the pixel P have a gradation value corresponding to the first light emitting device 21*a*, a gradation value corresponding to the second light emitting device 21*b*, and a gradation value corresponding to the third light emitting device 21*c*. The error values also have an error value corresponding to the first light emitting device 21*a*, an error value corresponding to the second light emitting device 21*b*, and an error value corresponding to the third light emitting device 21*c*.

The gradation value processor 31*b* adds the gradation value corresponding to the first light emitting device 21*a* and the error value, adds the gradation value corresponding to the second light emitting device 21*b* and the error value, and adds the gradation value corresponding to the third light emitting device 21*c* and the error value. In other words, the gradation value processor 31*b* processes gradation values for each of the light emitting devices 21 included in the pixel P. Since the processing of gradation values by the gradation value processor 31*b* for each of the light emitting devices 21 is the same as each other, the processing of gradation values will be described below as the processing of gradation values for the pixel P, without distinguishing between the light emitting devices 21.

The gradation value processor 31*b* determines whether the gradation value of the pixel P to which the error value has been added (hereinafter referred to as the added gradation value of the pixel P) matches a specific gradation value. If the added gradation value of the pixel P is a decimal, the gradation value processor 31*b* compares the integer portion of the added gradation value of the pixel P with the specific gradation value. If the added gradation value of the pixel P matches one of the specific gradation values in the table stored in the memory circuit 31*a*, the gradation value processor 31*b* transmits the added gradation value of that pixel P to the drive signal generator 31*d*. In this case, when the added gradation value of the pixel P is a decimal, the gradation value processor 31*b* transmits only the integer portion of the added gradation value to the drive signal generator 31*d*, and the decimal portion of the added gradation value to the error diffusion calculator 31*c*.

Meanwhile, if the added gradation value of the pixel P does not match any of the specific gradation values in the table stored in the memory circuit 31*a*, the gradation value processor 31*b* modifies the added gradation value of that pixel P to a specific gradation value.

The case where the added gradation value of the pixel P does not match any of the specific gradation values is when the added gradation value (integer portion of the added gradation value) of the pixel P corresponds to a first eliminated gradation value. The first eliminated gradation value is a gradation value corresponding to the frame period F that has a non-emission subframe period SF on the beginning side of the subframe period SF that is an emission period in the given subframe period SFt (third subframe period SF3) and subsequent subframe periods SF among the subframe periods SF.

Examples of the first eliminated gradation values include, but are not limited to, "8" (gradation data: "00001000"), "128" (gradation data: "10000000"), "159" (gradation data: "10011111"), "192" (gradation data: "11000000"), etc.

Furthermore, the case where the added gradation value of the pixel P does not match any of the specific gradation values is when the added gradation value (integer portion of the added gradation value) of the pixel P corresponds to a second eliminated gradation value. The second eliminated gradation value is a gradation value corresponding to a frame period F for which the given subframe period SFt (third subframe period SF3) is an emission period and that has a non-emission subframe period SF between the given subframe period SFt and an emission subframe period SF on the beginning side of the given subframe period SFt among the subframe periods SF.

Examples of the second eliminated gradation values include, but are not limited to, "5" (gradation data: "00000101"), "13" (gradation data: "00001101"), "29" (gradation data: "00011101"), "61" (gradation data: "00111101"), "125" (gradation data: "01111101"), etc. In this manner, the first and second eliminated gradation values are not defined as specific gradation values, but are gradation values different from the specific gradation values.

In other words, if the added gradation value (integer portion of the added gradation value) of the pixel P matches one of the first and second eliminated gradation values, the gradation value processor 31*b* modifies the added gradation value of that pixel P to a specific gradation value. The gradation value processor 31*b* specifically modifies the added gradation value of that pixel P to the largest specific gradation value among the specific gradation values that are smaller than the added gradation value (integer portion of the added gradation value) of that pixel P. For example, if the added gradation value of the pixel P is "159", which matches the first eliminated gradation value, the gradation value processor 31*b* modifies the added gradation value of the pixel P to "127", which is the largest specific gradation value among the specific gradation values that are smaller than "159".

The gradation value processor 31*b* illustrated in FIG. 4 transmits, to the drive signal generator 31*d*, the added gradation value of the pixel P after the modification. The gradation value processor 31*b* transmits, to the error diffusion calculator 31*c*, the difference between the added gradation value (if the added gradation value is a decimal, the value including the decimal portion) of the pixel P before the modification and the added gradation value of the pixel P after the modification.

Figure 9:
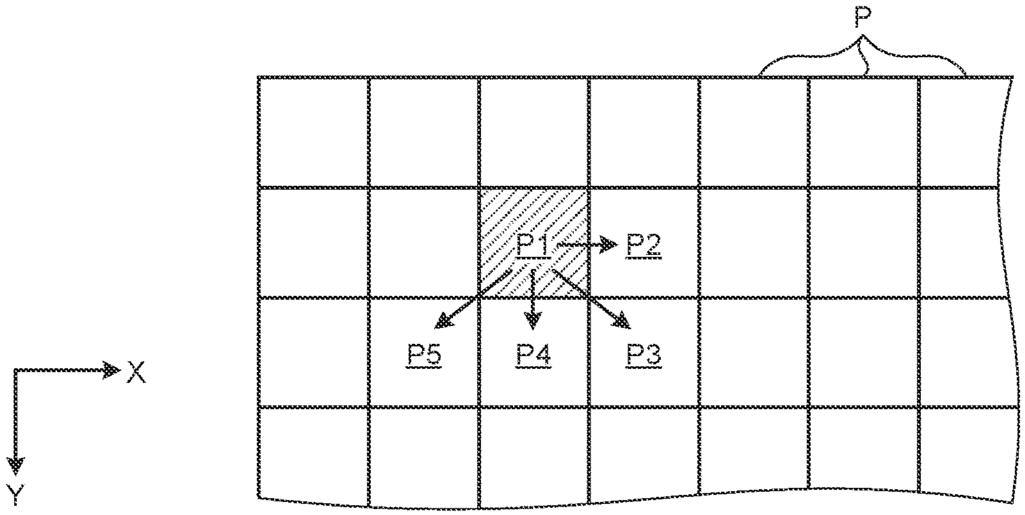
FIG. 9 is a diagram illustrating distribution of error values performed by an error diffusion calculator.

The error diffusion calculator 31*c* distributes, to other pixels P, an error value, which is the difference between the added gradation value of the pixel P before the modification and the added gradation value of the pixel P after the modification. FIG. 9 is a diagram illustrating distribution of an error value performed by the error diffusion calculator 31*c*. FIG. 9 illustrates the pixels P lined up in the display area DA.

If an error value occurs in a first pixel P1 hatched in FIG. 9, the error diffusion calculator 31*c* distributes the error value to the pixels P that are adjacent to the first pixel P1 and the drive signals of which are processed after the first pixel P1. In the present embodiment, error values are distributed to the following four pixels P by the error diffusion calculator 31*c*. In other words, the four pixels P are a second pixel P2 on the +X side of the first pixel P1, a third pixel P3 on the +Y side of the second pixel P2, a fourth pixel P4 on the +Y side of the first pixel P1, and a fifth pixel P5 on the −X side of the fourth pixel P4.

The error diffusion calculator 31*c* weights the four pixels P in the distribution. Specifically, the weighting ratio is, for example, the second pixel P2:the third pixel P3:the fourth pixel P4:the fifth pixel P5=7:1:5:3, but not to mention, is not limited thereto.

For example, if the added gradation value of the first pixel P1 is "159", the added gradation value of the first pixel P1 is modified by the gradation value processor 31*b* to "127", a specific gradation value, and the error value becomes "32" (=159-127). In this case, the error diffusion calculator 31*c* distributes "14" to the second pixel P2, "2" to the third pixel P3, "10" to the fourth pixel P4, and "6" to the fifth pixel P5. The error diffusion calculator 31*c* transmits the distributed values to the gradation value processor 31*b*.

In this case, when processing for the second pixel P2 following the first pixel P1, the gradation value processor 31*b* performs the aforementioned processing by adding the error value “14” corresponding to the second pixel P2 to the gradation value of the second pixel P2 that the pixel signal transmitted from the external device has.

In this manner, when the added gradation value of the pixel P corresponds to the first eliminated gradation value, the control circuit 30 modifies the added gradation value of the pixel P to the specific gradation value. When the added gradation value of the pixel P corresponds to the first eliminated gradation value, the control circuit 30 adds the difference between the first eliminated gradation value and the added gradation value of the pixel P after the modification to the gradation values of other pixels P adjacent to the pixel P corresponding to the first eliminated gradation value.

When the added gradation value of the pixel P corresponds to the gradation value corresponding to the frame period F that has a non-emission subframe period SF between two emission subframe periods SF, the control circuit 30 modifies the added gradation value of the pixel P to the gradation value corresponding to the frame period F during which the subframe periods SF that are emission periods are consecutively lined up.

The aforementioned gradation values corresponding to the frame period F that has a non-emission subframe period SF between two emission subframe periods SF are gradation values for which the emission periods are discontinuous. The gradation values are included in the first and second eliminated gradation values.

“159”, the first eliminated gradation value (gradation data: “10011111”)

“61”, the second eliminated gradation value (gradation data: “00111101”)

The aforementioned gradation values corresponding to the frame period F during which the subframe periods SF that are emission periods are consecutively lined up are included in the specific gradation values. For example, if the added gradation value of the pixel P corresponds to “61”, the second eliminated gradation value, the control circuit 30 modifies the added gradation value of the pixel P to “60”, the specific gradation value illustrated in FIG. 8.

The drive signal generator 31*d* illustrated in FIG. 4 generates gradation data on the basis of one of the added gradation values of the pixel P transmitted from the gradation value processor 31*b* and the added gradation values of the pixel P after the modification (hereinafter referred to as “received gradation values”). A received gradation value matches any one of the specific gradation values. The drive signal generator 31*d* generates gradation data by converting received gradation values to binary numbers.

As described above, in the gradation data, “1” indicates the emission state of the light emitting device 21, and “0” indicates the non-emission state of the light emitting device 21. In the gradation data, the n-th bit value corresponds to the n-th subframe period SF. In other words, the drive signal generator 31*d* generates gradation data on the basis of the additional gradation values calculated from the gradation values of the pixel P. Thereby, for each of the subframe periods SF included in the frame period F, the emission period in which the light emitting device 21 is in the emission state or the non-emission period in which the light emitting device 21 is in the non-emission state is defined. The frame image is displayed during the frame period F.

The drive signal generator 31*d* then generates a drive signal by using the gradation data, and transmits the drive signal to the signal output circuit 32. The drive signal generator 31*d* may receive the received gradation values transmitted from the gradation value processor 31*b* as binary data. In this case, the drive signal generator 31*d* generates a drive signal by using the received gradation values as gradation data without conversion.

The operation of the display device 1 will be described next for a case where, in the first pixel P1, the added gradation value corresponding to the red first light emitting device 21*a* is “127”, the added gradation value corresponding to the green second light emitting device 21*b* is “128”, and the added gradation value corresponding to the blue third light emitting device 21*c* is “0”. When a frame image is displayed on the basis of the drive signal having the gradation data generated with these added gradation values as they are, color breakup occurs as described above.

Since the added gradation value “127” corresponding to the first light emitting device 21*a* matches the specific gradation value (FIG. 8), the gradation value processor 31*b* transmits the added gradation value corresponding to the first light emitting device 21*a* to the drive signal generator 31*d* without modifying it.

The added gradation value “128” corresponding to the second light emitting device 21*b* corresponds to the first eliminated gradation value and does not match a specific gradation value (FIG. 8). Thus, the gradation value processor 31*b* modifies the added gradation value corresponding to the second light emitting device 21*b* to the largest specific gradation value “127” among the specific gradation values that are smaller than the added gradation value “128”.

The gradation value processor 31*b* then transmits, to the drive signal generator 31*d*, the added gradation value after the modification “127” corresponding to the second light emitting device 21*b*, and transmits, to the error diffusion calculator 31*c*, the error value “1” between the added gradation value before the modification “128” and the added gradation value after the modification “127” corresponding to the second light emitting device 21*b*.

Since the added gradation value “0” corresponding to the third light emitting device 21*c* matches the specific gradation value (FIG. 8), the gradation value processor 31*b* transmits the added gradation value corresponding to the third light emitting device 21*c* to the drive signal generator 31*d* without modifying it.

The error diffusion calculator 31*c* distributes “$7/16$” to the second pixel P2, “$1/16$” to the third pixel P3, “$5/16$” to the fourth pixel P4, and “$3/16$” to the fifth pixel P5 on the basis of the error value “1” corresponding to the second light emitting device 21*b*. The error diffusion calculator 31*c* transmits the distributed error values to the gradation value processor 31*b*. The gradation value processor 31*b* adds the transmitted error value corresponding to the second light emitting device 21*b* to the gradation value corresponding to the second light emitting device 21*b* in the pixel P when processing the gradation value of the pixel P corresponding to that error value, thereby calculating the added gradation value corresponding to the second light emitting device 21*b* in that pixel P.

The drive signal generator 31*d* generates gradation data on the basis of the received gradation values. The drive signal generator 31*d* generates the gradation data “01111111” on the basis of the added gradation value “127” corresponding to the first light emitting device 21*a*. The drive signal generator 31*d* generates the gradation data “01111111” on the basis of the added gradation value after the modification “127” corresponding to the second light emitting device 21*b*. The drive signal generator 31*d* generates the gradation data "00000000" on the basis of the added gradation value "0" corresponding to the third light emitting device 21*c*.

Furthermore, the drive signal generator 31*d* transmits a drive signal having the gradation data to the signal output circuit 32. The signal output circuit 32 transmits the drive signal to the device drive circuit 22 of the pixel P corresponding to that drive signal. The device drive circuit 22 drives the light emitting device 21 on the basis of the gradation data that the drive signal has at the timing scanned by the scanning circuit 33.

The first light emitting device 21*a* consecutively becomes in the emission state during the first to seventh subframe periods SF1, SF2, SF3, SF4, SF5, SF6, SF7 and becomes non-emission state during the eighth subframe period SF8 on the basis of the gradation data "01111111" corresponding to the first light emitting device 21*a*. The second light emitting device 21*b* consecutively becomes in the emission state during the first to seventh subframe periods SF1, SF2, SF3, SF4, SF5, SF6, SF7 and becomes non-emission state during the eighth subframe period SF8 on the basis of the gradation data "01111111" corresponding to the second light emitting device 21*b*. The third light emitting device 21*c* consecutively becomes in the non-emission state during the first to eighth subframe periods SF1, SF2, SF3, SF4, SF5, SF6, SF7, SF8 on the basis of the gradation data "00000000" corresponding to the third light emitting device 21*c*.

As a result, in the first pixel P1, the emission periods of the first light emitting device 21*a* and the second light emitting device 21*b* overlap during the first to seventh subframe periods SF1, SF2, SF3, SF4, SF5, SF6, SF7. Thus, even when the viewer's eyes move, the light of the light emitting device 21 can be prevented from being visible alone, which in turn can prevent color breakup and degradation of display quality.

Even when the added gradation value corresponding to the light emitting device 21 included in the pixel P is modified and an error value occurs, the error value is distributed to other pixels P. Thus, the error value of the pixel P is compensated for by other pixels P, thereby preventing the degradation of display quality.

Although the preferred embodiments of the present disclosure have been described, the embodiments do not limit the present disclosure. What has been disclosed in the embodiments is merely an example, and various modifications may be made without departing from the spirit of the present disclosure. As may be understood, any modification made as appropriate without departing from the spirit of the present disclosure is also included in the technical scope of the present disclosure.

Figure 10:
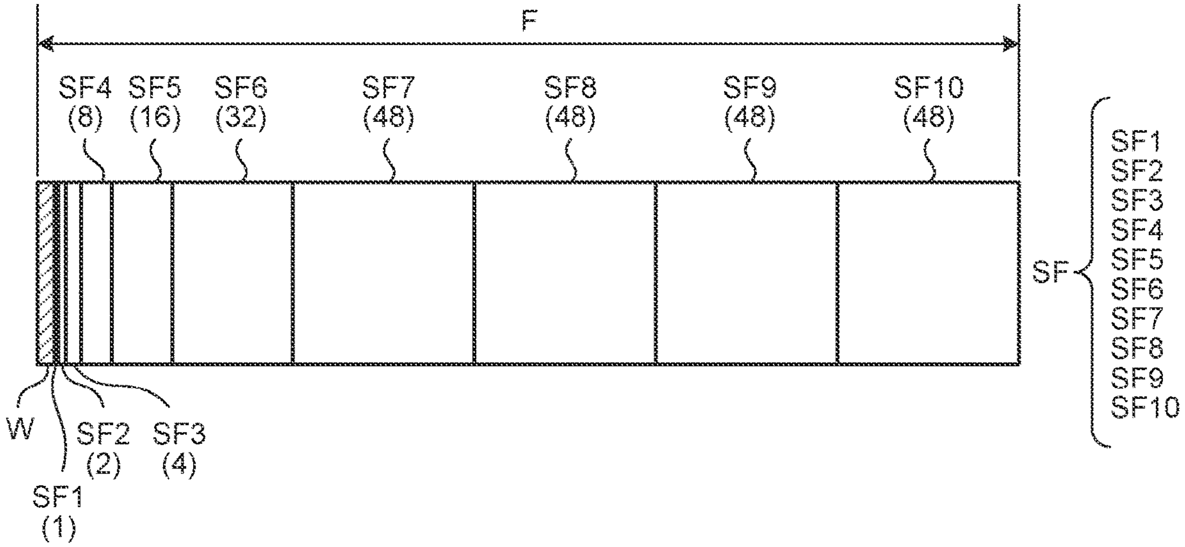
FIG. 10 is a diagram illustrating a frame period according to a modification of an embodiment.

FIG. 10 is a diagram illustrating a frame period F according to a modification of the embodiment. As illustrated in FIG. 10, the number of the subframe periods SF is 10. The subframe periods SF in the modification has two or more (four in the present modification) subframe periods SF that are the same period as each other.

Two or more subframe periods SF that are the same period as each other have the longest period of the subframe periods SF. In the present modification, the two or more subframe periods SF that are the same period as each other are the seventh subframe period SF7, the eighth subframe period SF8, the ninth subframe period SF9, and the tenth subframe period SF10.

Furthermore, in the present modification, the subframe periods SF are consecutively lined up in order of shortest period from the beginning, and the ratio of two subframe periods SF that are adjacent to each other in the subframe periods SF other than the two or more subframe periods SF that are the same period as each other among the subframe periods SF is 2. In other words, in the present modification, specifically, the ratio of the first subframe period SF1, the second subframe period SF2, the third subframe period SF3, the fourth subframe period SF4, the fifth subframe period SF5, and the sixth subframe period SF6 is 1:2:4:8:16:32. In other words, what is called a binary weighting using a geometric progression with a common ratio of "2" is applied to the first to sixth subframe periods SF1, SF2, SF3, SF4, SF5, and SF6.

The ratio of the subframe period SF in the beginning to the sum of the two or more subframe periods SF that are the same period as each other is 1:192. In other words, in the present modification, the ratio of the first subframe period SF1 to the sum of the seventh subframe period SF7, the eighth subframe period SF8, the ninth subframe period SF9, and the tenth subframe period SF10 is 1:192. The ratio of the first subframe period SF1, the seventh subframe period SF7, the eighth subframe period SF8, the ninth subframe period SF9, and the tenth subframe period SF10 is 1:48:48:48:48.

The subframe periods SF are defined in this manner, whereby the gradation values "111", "159", and "207", which correspond to the first eliminated gradation value in the aforementioned embodiment, can be defined as specific gradation values in addition to the specific gradation values illustrated in FIG. 8. In the present modification, the gradation data corresponding to the gradation value "111" is "0001111111", the gradation data corresponding to the gradation value "159" is "0011111111", and the gradation data corresponding to the gradation value "207" is "0111111111", and the emission periods are consecutive from the first subframe period SF1. Thus, color breakup can be prevented at the gradation values "111", "159", and "207" as well. The gradation value "127" (gradation data: "0011011111") corresponds to a specific gradation value in the frame period F of the aforementioned embodiment, but does not correspond to a specific gradation value in the frame period F of the present modification. However, the gradation values "111," "159," and "207" correspond to the specific gradation values in the present modification, and the total number of specific gradation values in the present modification is larger than the total number of specific gradation values in the aforementioned embodiment. Thus, the number of specific gradation values is increased from the case where the number of the subframe periods SF is 8 as described above, so that the gradation of the pixel P can be expressed more finely.

Not to mention, the subframe periods SF are not limited as described above. For example, the number of the subframe periods SF may be further increased to 12, the ratio of the first subframe period SF1, the second subframe period SF2, the third subframe period SF3, the fourth subframe period SF4, and the fifth subframe period SF5 may be 1:2:4:8:16, and the ratio of the first subframe period SF1 to each of the sixth to twelfth subframe periods SF6, SF7, SF8, SF9, SF10, SF11, and SF12 may be 1:32:32:32:32:32:32:32. The subframe periods SF do not have to have two subframe periods SF that are adjacent to each other having a ratio of 2, nor do they have to be lined up in order of shortest period from the beginning.

The second excluded gradation value may be defined as a specific gradation value. In this case, the emission period may be discontinuous during the subframe periods SF before the given subframe period SFt, but the color breakup is prevented because the period is relatively short during the subframe periods SF before the given subframe period SFt.

When the added gradation value of the pixel P corresponds to the first eliminated gradation value, the gradation value processor 31*b* may modify the added gradation value of the pixel P to the specific gradation value with the smallest difference from the added gradation value of that pixel P. For example, if the added gradation value of the pixel P is "25", the added gradation value may be set to "28", the added gradation value with the smallest difference from the added gradation value of the pixel P of "25", instead of "15", the largest specific gradation value among the added gradation values that are smaller than the added gradation value of the pixel P. In this case, the error value "−3" (=25-28) is distributed to other pixels P.

The gradation value processor 31*b* may determine whether the value including integer and decimal portions of the added gradation value of the pixel P matches a specific gradation value. If the added gradation value of the pixel P is a decimal, the added gradation value does not match a specific gradation value that is an integer. Thus, the gradation value processor 31*b* modifies the added gradation value of the pixel P to a specific gradation value, and transmits, to the error diffusion calculator 31*c*, the difference between the added gradation value of the pixel P after the modification and the added gradation value of the pixel P before the modification.

The control circuit 30 does not have to perform error diffusion. In this case, the image processing circuit 31 does not include the error diffusion calculator 31*c*. The gradation value processor 31*b* determines whether the gradation value of the pixel P matches a specific gradation value, that is, whether the gradation value of the pixel P matches one of the first and second eliminated gradation values, without adding an error value to the gradation value of the pixel P that the pixel signal has.

It is understood that other effects brought about by the aspects described in the embodiments, etc., which are obvious from the description of the present specification or which can be conceived of by a person skilled in the art, are naturally brought about by the present disclosure.

What is claimed is:

1. A display device comprising:

a plurality of light emitting devices included in a pixel; and a control circuit configured to define each of a plurality of subframe periods included in a frame period during which a frame image is displayed as one of an emission period in which the light emitting device is in an emission state and a non-emission period in which the light emitting device is in a non-emission state, and to control emission of the light emitting device, based on a gradation value of the pixel, wherein the subframe periods are consecutively lined up from a beginning of the frame period, and in a case where the gradation value of the pixel corresponds to a first eliminated gradation value corresponding to the frame period that has the subframe period that is the non-emission period on a beginning side of the subframe period that is the emission period in a given subframe period set in advance and the subsequent subframe periods among the subframe periods, the control circuit modifies the gradation value of the pixel to a specific gradation value corresponding to the frame period during which the given subframe period is the emission period and the subframe periods that are the emission periods are consecutively lined up.

2. The display device according to claim 1, wherein in a case where the gradation value of the pixel corresponds to a second eliminated gradation value corresponding to the frame period for which the given subframe period is the emission period and that has the subframe period that is the non-emission period between the given subframe period and the subframe period that is the emission period on the beginning side of the given subframe period among the subframe periods, the control circuit modifies the gradation value of the pixel to the specific gradation value.

3. The display device according to claim 1, wherein the given subframe period corresponds to the subframe period in a first half of the frame period among the subframe periods.

4. The display device according to claim 3, wherein the number of the subframe periods is 8, and the given subframe period is the third subframe period from the beginning.

5. The display device according to claim 1, wherein the subframe periods are consecutively lined up in order of shortest period from the beginning, and a ratio of two of the subframe periods that are adjacent to each other in the subframe periods is 2.

6. The display device according to claim 1, wherein the subframe periods have two or more of the subframe periods that are the same period as each other.

7. The display device according to claim 6, wherein the two or more subframe periods that are the same period as each other have a longest period of the subframe periods.

8. The display device according to claim 7, wherein the subframe periods are consecutively lined up in order of shortest period from the beginning, and a ratio of two of the subframe periods that are adjacent to each other in the subframe periods other than the two or more subframe periods that are the same period as each other among the subframe periods is 2.

9. The display device according to claim 8, wherein a ratio of the subframe periods other than the two or more subframe periods that are the same period as each other among the subframe periods is 1:2:4:8:16:32, and a ratio of the subframe period in the beginning to a sum of the two or more subframe periods that are the same as each other is 1:192.

10. The display device according to claim 1, wherein, when the gradation value of the pixel corresponds to the first eliminated gradation value, the control circuit modifies the gradation value of the pixel to the specific gradation value with a smallest difference from the gradation value of the pixel.

11. The display device according to claim 1, wherein, when the gradation value of the pixel corresponds to the first eliminated gradation value, the control circuit modifies the gradation value of the pixel to the largest specific gradation value of the specific gradation values that are smaller than the gradation value of the pixel.

12. The display device according to claim 1, wherein the control circuit adds a difference between the first eliminated gradation value and the gradation value of the pixel after the modification to gradation values of other pixels adjacent to the pixel corresponding to the first eliminated gradation value.

13. The display device according to claim 1, wherein the light emitting devices each have a red light emitting device, a green light emitting device, and a blue light emitting device.

14. The display device according to claim 1, wherein the light emitting device is an inorganic light emitting device or an organic light emitting device.

15. A display device comprising:

a plurality of light emitting devices included in a pixel; and a control circuit configured to define each of a plurality of subframe periods included in a frame period during which a frame image is displayed as one of an emission period in which the light emitting device is in an emission state and a non-emission period in which the light emitting device is in a non-emission state, and to control emission of the light emitting device, based on a gradation value of the pixel, wherein the subframe periods are consecutively lined up from a beginning of the frame period, and in a case where the gradation value of the pixel corresponds to a gradation value corresponding to the frame period that has the subframe period that is the non-emission period between two of the subframe periods that are the emission periods, the control circuit modifies the gradation value of the pixel to a gradation value corresponding to the frame period during which the subframe periods that are the emission periods are consecutively lined up.

* * * * *